United States Patent [19]
Leonard

[11] 3,951,231
[45] Apr. 20, 1976

[54] SEISMIC EXPLORATION
[76] Inventor: Willie Burt Leonard, 5902 Royalton, Houston, Tex. 77036
[22] Filed: Dec. 24, 1974
[21] Appl. No.: 536,237

Related U.S. Application Data
[63] Continuation of Ser. No. 521,966, Nov. 8, 1974, which is a continuation of Ser. No. 338,306, March 5, 1973.

[52] U.S. Cl. .............................. 181/140; 181/118; 181/120
[51] Int. Cl.² ........................................ G01K 10/00
[58] Field of Search .................... 181/118, 120, 140

[56]     References Cited
UNITED STATES PATENTS
2,281,751   5/1942   Cloud ................................ 181/106
3,588,801   6/1971   Leonard ............................. 181/115

Primary Examiner—T. H. Tubbesing
Assistant Examiner—T. M. Blum
Attorney, Agent, or Firm—Murray Robinson

[57]     ABSTRACT

A marine acoustic seismic generator carried on the deck of a boat is coupled to a body of water in which the boat floats by a column of water in a pipe extending between the generator and the body of water. Post explosion oscillations are damped or terminated by venting the pipe of gas, either through an orifice or a valve, at a selected time, to a selected pressure, to the atmosphere or below water.

16 Claims, 6 Drawing Figures

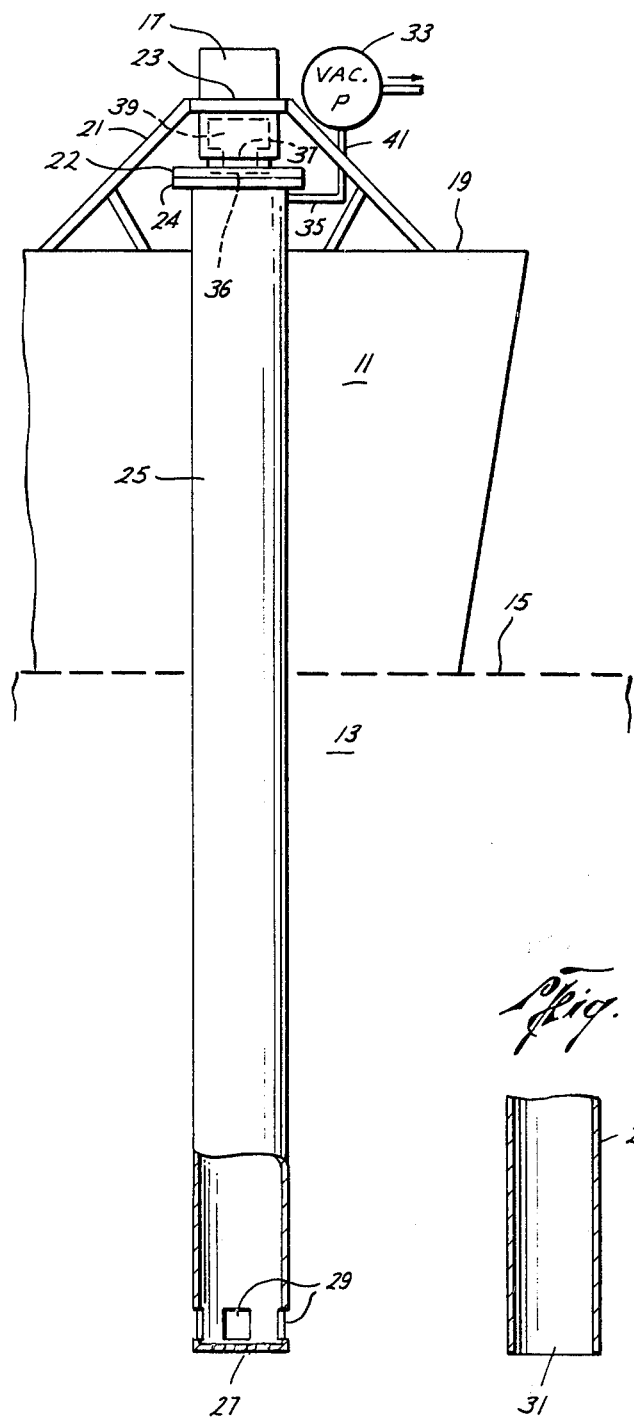
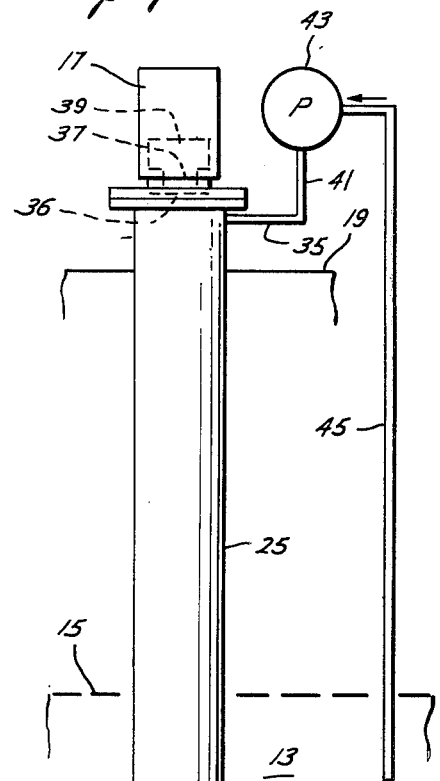
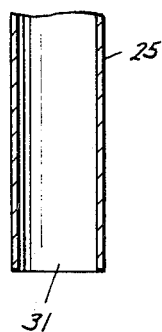

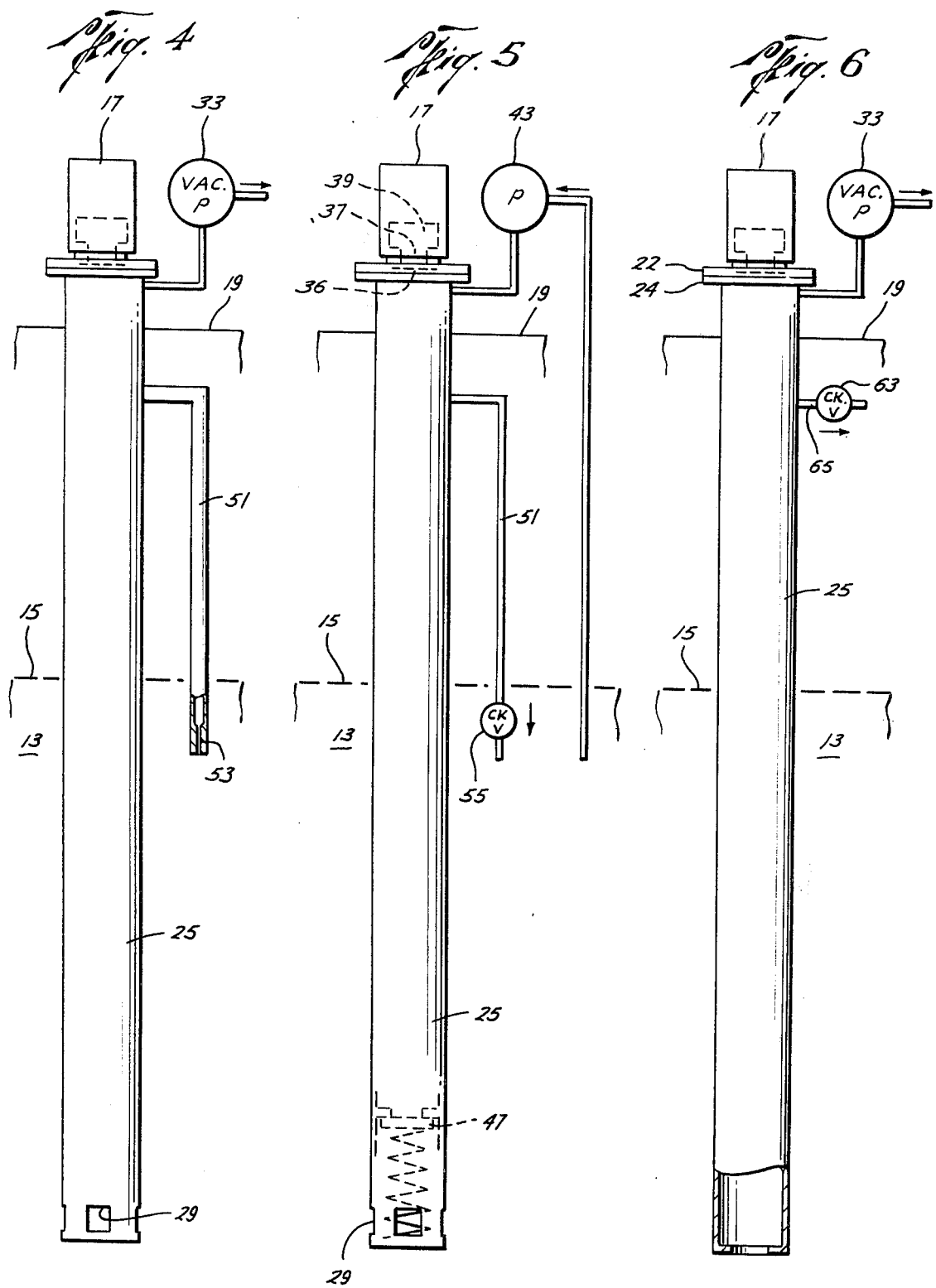

SEISMIC EXPLORATION

CROSS REFERENCE TO RELATED APPLICATIONS

The present application is a continuation of applicant's prior copending application Ser. No. 521,966 filed Nov. 8, 1974, entitled Seismic Exploration, whose priority is claimed, the latter being a continuation of the inventor's prior application Ser. No. 338,306 filed Mar. 5, 1973 for Seismic Exploration, whose priority is claimed.

BACKGROUND OF THE INVENTION

This invention pertains to seismic exploration. In particular the invention relates to seismic exploration employing a marine acoustic seismic generator of the type shown in my prior U.S. Pat. No. 3,588,801 issued June 28, 1971.

In using marine acoustic seismic generators there is difficulty in handling connecting lines and hoses extending from the operator's boat to the submerged generator. The present invention is directed toward elimination of such lines and hoses. A further difficulty encountered in the use of such apparatus is the oscillatory action following the initial explosion. Usually it is desirable to have only a single pulse of brief duration produced in the water, for otherwise the reflections and refractions from the initial pulse may be masked by reflections and refractions received from later energy pulses and it may be difficult or impossible to sort out the several reflections and refractions appearing at the seismic receivers. The invention overcomes that problem too.

SUMMARY OF THE INVENTION

According to the invention a column of water enclosed in a pipe is used to couple an on-board marine acoustic seismic generator to the body of water in which the operator's boat is floating. The water column can be elevated into the pipe from the body of water by a vacuum pump or the pipe can be filled with water from the top, e.g. by means of a pump. A pressure can be maintained in the column of water in excess of its static head. Vent means may be provided in the pipe to exhaust therefrom the gases released to the pipe from the seismic generator, thereby to reduce or terminate or control possible oscillations in the water following the initial energy pulse produced by the generator. The vent means may exhaust to atmosphere or to the body of water. Preferably the exhaust is under water, but to a pressure less than that at the bottom of the pipe. The exhaust may be through a selected orifice or through a valve, the latter being opened at a selected pressure or time.

BRIEF DESCRIPTION OF THE DRAWINGS

For a detailed description of preferred embodiments of the invention, reference will now be made to the accompanying drawings wherein FIG. 1 is an elevational view of a seismic exploration boat carrying apparatus embodying the invention.

FIG. 2 is a detail of a modified form of the apparatus;

FIG. 3 is an elevation showing a further modification; and

FIGS. 4–6 are elevations showing other modifications.

DESCRIPTION OF THE PREFERRED EMBODIMENTS

Referring now to FIG. 1 there is shown a boat 11 floating in a body of water 13, the interface between the water and the earth's atmosphere being indicated at 15. A marine seismic generator 17, e.g. as in the aforementioned U.S. Pat. No. 3,588,801, is suitably supported outboard of the boat from its deck, e.g. by boom frame 21 connected to a flange 23 extending from the generator housing. Generator 17 provides means to release suddenly a quantity of high pressure gas or other fluid into the medium at the generator's outlet.

To the lower end of the generator 17, e.g. by companion flanges 22, 24, one on the generator and one on the pipe, is connected a pipe 25. The flanges are suitably fastened together, e.g. by bolts not shown, providing a fluid tight connection between the pipe and the generator, placing the pipe in communication with the generator outlet. The pipe may be made of steel or other sturdy material. Usually pipe 25 will be rigid, or if flexible it will not be expansible to any great degree. To prevent recoil upon actuation of the generator, the bottom of the pipe is preferably closed by plate 27, and side outlets 29 are provided adjacent the lower end of the pipe, as shown in FIG. 4 of U.S. Pat. No. 3,588,801.

Alternatively, as shown in FIG. 2, the bottom of the pipe may be substantially open, as shown at 31, reliance being placed on the weight of the pipe and generator to minimize recoil. The construction will then be substantially the same as shown in FIG. 5 of the aforementioned U.S Pat. No. 3,588,801 to the extent of including a long pipe attached to the lower end of the generator, although the function of the pipe in the present invention is different. In U.S. Pat. No. 3,588,801 the function of the pipe is to contain the exhaust gases from the submerged generator whereas in the present invention the purpose of the pipe is to conduct the seismic pulse from the generator on the boat to beneath the water through the intervening atmosphere. Nevertheless the constructional details are alike so that reference may be made therefor to U.S. Pat. No. 3,588,801.

Returning to FIG. 1, in order to fill pipe 25 with water to conduct a seismic pulse from the generator 17 to the water 13, a vacuum pump 33 is connected to the top end of pipe 25 by a fluid conduit 35. By this means the pipe 25 is evacuated of air, and atmospheric pressure on water 13 forces it up into the pipe 25 into contact with closure 36 of the generator 17, sealing around the outlet 37 from its pressure chamber 39. Such outlet would correspond to outlet 54 of FIG. 1 of the generator shown in U.S. Pat. No. 3,588,801.

Vacuum pump 33 will usually be operated to maintain a subatmospheric pressure to line 35 more than sufficient to elevate the water in the pipe to outlet 37. For example pump 33 may be located at an elevation above outlet 37 and water may be drawn up a distance in stand-pipe 41 connected between pipe 35 and pump 33. The column of water in pipe 25 is then at a pressure above atmospheric at the upper end of the column and at greater pressures therebelow.

Referring now to FIG. 3, the apparatus is the same as in FIG. 1 except that for the vacuum pump 33 has been substituted a water pump 43. For clarity, boom frame 21 has been omitted in this and subsequent figures. Pump 43 draws in water via inlet tube 45 which extends down into the body of water 13. Water from pump 43 is discharged via conduit 35 to the top of pipe 25. To retain water in pipe 25, a spring loaded, downwardly opening check valve 47 is positioned in the pipe near its lower end but above ports 29. Valve 47 retains water in pipe 25 until a pressure pulse is created by generator 17 but thereupon opens to communicate the pulse through the ports 29 to the surrounding water 13. In any of the embodiments the lower end of the pipe may be open, closed or, as shown in FIG. 3, partially closed.

Valve 47 is spring loaded sufficiently to stay closed when pump 43 has filled pipe 25 and a pressure head 41 has been placed thereon. However the valve opens immediately in response to release of pressure fluid from generator 17. The water in pipe 25, as in the FIG. 1 and other embodiments hereof, is in contact with the generator 17 around the outlet opening thereof so that the pressure pulse therefrom acts immediately on the water in the pipe and is conducted by the water down the pipe and out ports 29 into the surrounding body of water 13.

Referring now to FIG. 4, there is shown a further modification of the invention wherein the apparatus is essentially the same as that shown in FIG. 1 except that exhaust gas vent means is provided comprising a vent tube 51 extending from near the upper end of pipe 25 above interface 15 to a level in water 13 below the surface. An orifice 53 of a size suitably selected to prevent too rapid venting of pipe 25, is provided adjacent the lower end of tube 51. By this means after the generator 17 has been operated to create a high pressure pulse against the water in pipe 25, the spent gases from the generator can be vented slowly underwater through tube 51. Such venting allows the spent gases to be dissipated in an unobjectionable manner. Venting is desirable to reduce secondary seismic pulses.

A similar venting means can be provided for the FIG. 3 embodiment of the invention, same being shown in FIG. 5. In place of orifice 53, the lower end of the vent tube 51 is provided with a spring loaded downwardly opening check valve 55. Valve 55 remains closed during filling of pipe 25 by pump 43 but opens when the pressure from generator 17 occurs. The size of vent tube 51 is small compared to that of pipe 25, e.g. in the range of 1/10 to 1/100 of the cross section of pipe 25, so that most of the pressure energy is transmitted down pipe 25 to outlet ports 29. When the pressure in pipe 25 drops, water rushes back in to at least the level of interface 15, and the low pressure spent gases are expelled through valve 55.

In the embodiments of FIGS. 4 and 5, the spent gases from the generator are vented underwater to a pressure greater than atmosphere. If there is no environmental problem, the spent gases can be vented to the atmospher as shown in FIG. 6. The apparatus of FIG. 6 is substantially the same as that of FIG. 4 except for the fact the vent pipe 65 does not extend down below the surface of the water, and a spring loaded, outwardly opening check valve 63 is provided in the vent pipe. When the vacuum pump is operated, valve 63 closes, so that a vacuum is created in pipe 25 and water rises therein. But upon actuation of generator 17 valve 63 opens and remains open, slowly to vent the spent gases from pipe 25. FIG. 6 further illustrates a construction wherein the bottom of the pipe 25 is substantially open, as in FIG. 2, the ports 19 being omitted.

The FIG. 5 construction is also adapted for use with atmospheric venting. It is only necessary to dispose the end of the vent pipe 51 above water.

As compared with the prior art according to which the whole generator 17 is operated submerged below the surface of the water, being supplied with power and controlled via a hose bundle, the present invention eliminates the need for the underwater hose bundle, and keep the generator above water where it is easier to operate and maintain.

While preferred embodiments of the invention have been shown and described, modifications thereof can be made by one skilled in the art without departing from the spirit of the invention.

I claim:

1. Apparatus for seismic exploration from a boat over a body of water comprising
    a seismic generator including a pressure chamber having an outlet and a closure therefore movable between open and closed positions relative to said outlet and providing means to release suddenly a quantity of high pressure gas at the generator's outlet when said closure opens, said generator being adapted for support (above water) from a boat with its outlet above water,
    a pipe of low expansibility connected at one end to the generator around the outlet from the pressure chamber thereof and the closure therefor and adapted to extend downwardly from the generator so mounted on the boat to a level below the surface of the water in which the boat floats, and
    filling means operative when the generator is supported from a boat with its outlet above water for filling the pipe with water to a level above the surface of the body of water in which the pipe is immersed and adjacent to said outlet, and
    fluid passage means at the other end of the pipe for communicating same with the surrounding open water when the generator is mounted on a boat with the pipe extending downwardly to below the surface of the water as foresaid,
    said one end of the pipe being in unrestrained communicating with said pressure chamber when said closure opens, thereby to admit high pressure gas to said one end of the pipe.

2. Apparatus according to claim 1 wherein the filling means is a pump adapted to draw water from the body of water in which the boat floats and bring it into the pipe.

3. Apparatus according to claim 2 wherein the filling means is a pump adapted to draw water from the body of water in which the boat floats and brings it into the pipe, and the pump is a vacuum pump having its suction connected to the upper end of the pipe, the pipe having an opening adapted to admit water to the pipe from the body of water in which the boat floats, the pipe being fillable with water through said opening when the pump is actuated.

4. Apparatus according to claim 2 including a downwardly opening check valve in the pipe and wherein the pump is a water pump having its outlet connected to the pipe above the check valve.

5. Apparatus for seismic exploration comprising
    a seismic generator having an outlet and providing means to release suddenly a quantity of high pressure gas at the generator's outlet, said generator being adapted for support above water from a boat,
    a pipe connected to the generator around the outlet thereof adapted to extend downwardly from the generator so mounted on the boat to a level below the surface of the water, filling means for filling the pipe with water, said filling means being a pump, and vent means connected to the pipe near the upper end thereof above the surface of said body of water and extending down to a level to discharge below the surface of the body of water.

6. Apparatus according to claim 5 including flow control means in the vent means.

7. Apparatus for seismic exploration from a boat over a body of water having a seismic generator including a pressure chamber having an outlet and a closure therefore movable between open and closed positions relative to said outlet and providing means to release suddenly a quantity of high pressure gas at the generator's outlet when said closure opens, said generator being adapted for support from a boat with its outlet above water, a pipe of low expansibility connected at one end to the generator around the outlet from the pressure chamber thereof and the closure therefor and adapted to extend downwardly from the generator so mounted on the boat to a level below the surface of the water in which the boat floats, a pump adapted to draw water from said body of water for filling the pipe with water up to said outlet and closure in contact with the closure and in sealing engagement with the outlet, said one end of the pipe being free of communication to any other gas chamber than said pressure chamber and any chamber of said filling means, said one end of the pipe being in unrestrained communication with said pressure chamber when said closure opens, thereby to admit high pressure gas to the water in the pipe, and vent means including flow control means therein connected to said pipe near the upper end of thereof wherein the pump is a suction pump having its suction line connected to the upper end of the pipe and the vent means is long enough to discharge underwater and the flow control means is an orifice.

8. Apparatus for seismic exploration from a boat over a body of water having a seismic generator including a pressure chamber having an outlet and a closure therefore movable between open and closed positions relative to said outlet and providing means to release suddenly a quantity of high pressure gas at the generator's outlet when said closure opens, said generator being adapted for support from a boat with its outlet above water, a pipe of low expansibility connected at one end to the generator around the outlet from the pressure chamber thereof and the closure therefor and adapted to extend downwardly from the generator so mounted on the boat to a level below the surface of the water in which the boat floats, a pump adapted to draw water from said body of water for filling the pipe with water up to said outlet and closure in contact with the closure and in sealing engagement with the outlet, said one end of the pipe being free of communication to any other gas chamber than said pressure chamber and any chamber of said filling means, said one end of the pipe being in unrestrained communication with said pressure chamber when said closure opens, thereby to admit high pressure gas to the water in the pipe, and vent means including flow control means therein connected to said pipe near the upper end thereof including a downwardly opening check valve in the pipe, and wherein the pump is a water pump having its discharge line connected to the pipe above said check valve thereon, and wherein said flow control means includes an outwardly opening check valve, said valves being loaded by biasing means sufficiently strong to keep the valves closed with the pipe full of water.

9. Apparatus according to claim 8 wherein said biasing means is strong enough to keep the valve closed with the pipe full of water and under an additional pressure head.

10. Apparatus according to claim 9 wherein the water pump has its discharge line disposed at a level above the upper end of the pipe.

11. Apparatus for seismic exploration from a boat over a body of water having a seismic generator including a pressure chamber having an outlet and a closure therefore movable between open and closed positions relative to said outlet and providing means to release suddenly a quantity of high pressure gas at the generator's outlet when said closure opens, said generator being adapted for support from a boat with its outlet above water, a pipe of low expansibility connected at one end to the generator around the outlet from the pressure chamber thereof and the closure therefor and adapted to extend downwardly from the generator so mounted on the boat to a level below the surface of the water in which the boat floats, a pump adapted to draw water from said body of water for filling the pipe with water up to said outlet and closure in contact with the closure and in sealing engagement with the outlet, said one end of the pipe being free of communication to any other gas chamber than said pressure chamber and and chamber of said filling means, said one end of the pipe being in unrestrained communication with said pressure chamber when said closure opens, thereby to admit high pressure gas to the water in the pipe, and vent means including flow control means therein connected to said pipe near the upper end thereof wherein the vent means is adapted to discharge to the atmosphere, the flow control means is an outwardly opening check valve, and the pump is a suction pump.

12. Method of operating from a boat floating in a body of water a marine-acoustic seismic generator including a pressure gas chamber having a closure controlled outlet comprising the steps of placing the generator in position over a water covered area to be explored, on the boat with the generator outlet above water, communicating the generator output to below the water surface by means of a pipe, filling the pipe with water above the level of the surface of the body of water and adjacent, and actuating the generator to release into the water filled pipe high pressure gas from the pressure chamber outlet.

13. Method of operating a marine-acoustic seismic generator including a pressure gas chamber having a closure controlled outlet comprising the steps of placing the generator in position over a water covered area to be explored, with the generator outlet above water, communicating the generator outlet to below the water surface by means of a pipe, filling the pipe with water up to the pressure chamber outlet adjacent said closure, and actuating the generator to release into the water filled pipe high pressure gas from the pressure chamber outlet, said pipe being filled with water by evacuating the pipe of gas through the upper portion of the pipe and admitting water to the pipe through the lower portion thereof.

14. Method according to claim 13 wherein the pipe is filled by pumping water into the upper end thereof while blocking outflow from the lower end.

15. Method of operating a marine-acoustic seismic generator comprising the steps of placing the generator in position over a water covered area to be explored, with the generator above water, communicating the generator output to below the water surface by means of a pipe, filling the pipe with water, actuating the generator, and venting the upper end of the pipe at a level above the water surface into the water below the surface thereof to allow escape of gas from the pipe.

16. Apparatus for seismic exploration over a body of water comprising a boat floating in said body of water, a seismic generator including a pressure gas chamber having an outlet and a closure therefor movable between open and closed positions relative to said outlet and providing means to release suddenly a quantity of high pressure gas at the pressure gas chamber outlet when said closure opens, said generator being supported from said boat with said outlet above water, a metal pipe connected at one end to the outlet of said pressure gas chamber around said closure and in open communication with said chamber when said closure is in open position, the other end of said pipe being below the level of said body of water, and pump means on said boat for filling said pipe with water from said body of water to a level above the surface of the body of water in which the boat is floating, said level being adjacent, the outlet of said pressure gas chamber.

* * * * *

UNITED STATES PATENT AND TRADEMARK OFFICE
CERTIFICATE OF CORRECTION

PATENT NO. : 3,951,231
DATED : APRIL 20, 1976
INVENTOR(S) : WILLIE BURT LEONARD

It is certified that error appears in the above-identified patent and that said Letters Patent are hereby corrected as shown below:

Column 3, line 65: After "ports", delete "19" and insert --29--.

Column 4, lines 39 and 40: After "unrestrained", delete "communicating" and insert --communication--.

Column 3, lines 53 and 54: After "to the", delete "atmospher" and insert --atmosphere--.

Column 4, line 6: After "and", delete "keep" and insert --keeps--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*